(12) United States Patent
Wolf

(10) Patent No.: US 12,286,177 B2
(45) Date of Patent: Apr. 29, 2025

(54) BODY PART HOLDER ARRANGEMENT FOR FASTENING VEHICLE ATTACHMENT ELEMENTS

(71) Applicant: Dr. Ing. h.c. F. Porsche Aktiengesellschaft, Stuttgart (DE)

(72) Inventor: Gregor Wolf, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 4 days.

(21) Appl. No.: 18/413,333

(22) Filed: Jan. 16, 2024

(65) Prior Publication Data
US 2024/0253716 A1 Aug. 1, 2024

(30) Foreign Application Priority Data
Jan. 30, 2023 (DE) ............ 10 2023 102 126.5

(51) Int. Cl.
*B62D 65/02* (2006.01)
(52) U.S. Cl.
CPC ................. *B62D 65/024* (2013.01)
(58) Field of Classification Search
CPC .................................................. B62D 65/024
See application file for complete search history.

(56) References Cited

U.S. PATENT DOCUMENTS
2013/0193713 A1 8/2013 Reese

FOREIGN PATENT DOCUMENTS
DE 20115099 U1 2/2003
DE 102020125811 A1 4/2022
WO WO-2014029622 A1 * 2/2014 ............ B25B 5/064

* cited by examiner

*Primary Examiner* — Rick K Chang
(74) *Attorney, Agent, or Firm* — Buchanan Ingersoll & Rooney PC

(57) ABSTRACT

A body part holder arrangement for fastening vehicle attachment elements at a carrier element by way of at least one clamping system including a chamber element and a pin element. The clamping system is configured as a zero point clamping system that can be actuated by a clamping medium, wherein the zero point clamping system in the mounted state is disconnected from the clamping medium. The zero point clamping system includes an interface in a clamping medium circuit, which, in the mounted state, can be connected to a connecting element on the vehicle attachment element, such that the zero point clamping system can be used for vehicle data or vehicle medium transmission.

10 Claims, 2 Drawing Sheets

BODY PART HOLDER ARRANGEMENT FOR FASTENING VEHICLE ATTACHMENT ELEMENTS

CROSS-REFERENCE TO RELATED APPLICATION

This application claims priority to German Patent Application No. 10 2023 102 126.5, filed Jan. 30, 2023, the content of such application being incorporated by reference herein in its entirety.

FIELD OF THE INVENTION

The invention relates to a body part holder arrangement for fastening vehicle attachment elements to a carrier element by means of at least one clamping system consisting of a chamber element and a pin element. The invention also relates to a method for mounting a vehicle attachment element by means of such a body part holder arrangement. It should be noted in this context that the term vehicle attachment element can include both individual vehicle attachment parts, such as a fender, as well as vehicle modules, such as front or rear vehicle modules.

BACKGROUND OF THE INVENTION

In principle, it is known to fasten vehicle attachment elements, for example, body parts, interior parts or also functional parts, for example, lighting elements, in a friction-locking, positive-locking and/or in a material-locking manner to a corresponding carrier element. From US patent application US 2013/0 193 713 A1, which is incorporated by reference herein, it is also known to connect such vehicle attachment elements with the corresponding carrier element via a clamping system. Although the vehicle attachment elements should be releasably arranged on the carrier element, a replacement in the event of maintenance or due to a customer request in light of a confined space and the thus restricted accessibility is very complex and therefore costly. In addition, transmission systems for data or even media must be decoupled and disassembled in a complex manner.

SUMMARY OF THE INVENTION

An object of the invention is therefore to provide a body part holder arrangement or a method for the arrangement of a vehicle attachment element, which avoids the above-mentioned disadvantage in a simple and cost-efficient manner.

This object is achieved by means of a body part holder arrangement according to aspects of the invention, that the clamping system is configured as a zero point clamping system that can be actuated by a clamping medium, wherein the zero point clamping system in the mounted state is disconnected from clamping media, wherein the zero point clamping system comprises an interface in a clamping medium circuit, which, in the mounted state, can be connected to a connecting element on the vehicle attachment element, such that the zero point clamping system can be used for vehicle data or vehicle medium transmission. This makes it easy to release and, if necessary, replace the body part holder arrangement in a simple way, namely by applying a clamping medium. In addition, the zero point clamping system may be used for vehicle data or vehicle medium transfer. An example of this is the data transfer for assistance systems, such as a pedestrian protection system, sensor or also camera arrangements in the vehicle attachment element of the motor vehicle.

A particularly advantageous embodiment is characterized in that the interface in the chamber element or pin element and the associated connecting element is provided accordingly in the pin element or chamber element. As a result, no additional interfaces or connecting elements need to be provided and the existing elements of the zero point clamping system can be used.

In a particularly advantageous manner, the zero point clamping system can be electrically actuated. In this case, the zero point clamping system can be provided in an inductive, optical or electrical conduit system as a clamping medium circuit, via which the vehicle data transmission takes place, wherein the carrier element comprises corresponding inductive, optical or electrical interfaces or connecting devices.

Alternatively, the zero point clamping system may be hydraulically or pneumatically actuatable. In this case, the zero point clamping system in a hydraulic or pneumatic conduit system can be provided as a clamping medium circuit, via which vehicle media transfer takes place, wherein the carrier arrangement comprises corresponding hydraulic or pneumatic interfaces or connecting elements.

In a particularly advantageous embodiment, the pin element is arranged on the vehicle attachment element and the chamber element is arranged on the carrier element. This makes it particularly easy to perform actuation of the chamber elements, for example via permanently installed data transmission, pneumatic or hydraulic lines.

Advantageously, the pin element is integrally connected to the vehicle attachment element. For example, it can be cast directly during a casting process or printed with a 3D print part. However, it can also be subsequently molded to the vehicle attachment element.

In a particularly advantageous embodiment, the chamber elements of a vehicle attachment element are arranged in the clamping medium circuit, whereby the vehicle attachment element can be released by simply applying exactly one clamping medium source.

The invention is also solved by a method for attaching a vehicle attachment element by means of a body part holder arrangement according to any one of the preceding claims, characterized in that, in a first step, the at least one chamber element arranged on the carrier element is applied with a clamping medium in the clamping medium circuit, in a second step, the associated pin element is inserted and thus the vehicle attachment element is precisely arranged, in a third step, the chamber element is disconnected from the medium and thus the pin element is mechanically clamped to a stop, and, in a fourth step, the interface of the clamping medium circuit is activated. To advantageously release the vehicle attachment element, in a fifth step, the at least one interface is deactivated and, in a sixth step, the at least one chamber element is actuated by the clamping medium.

BRIEF DESCRIPTION OF THE DRAWINGS

The invention is explained in more detail with reference to a drawing. The figures show.

DETAILED DESCRIPTION OF THE INVENTION

Figure 1:
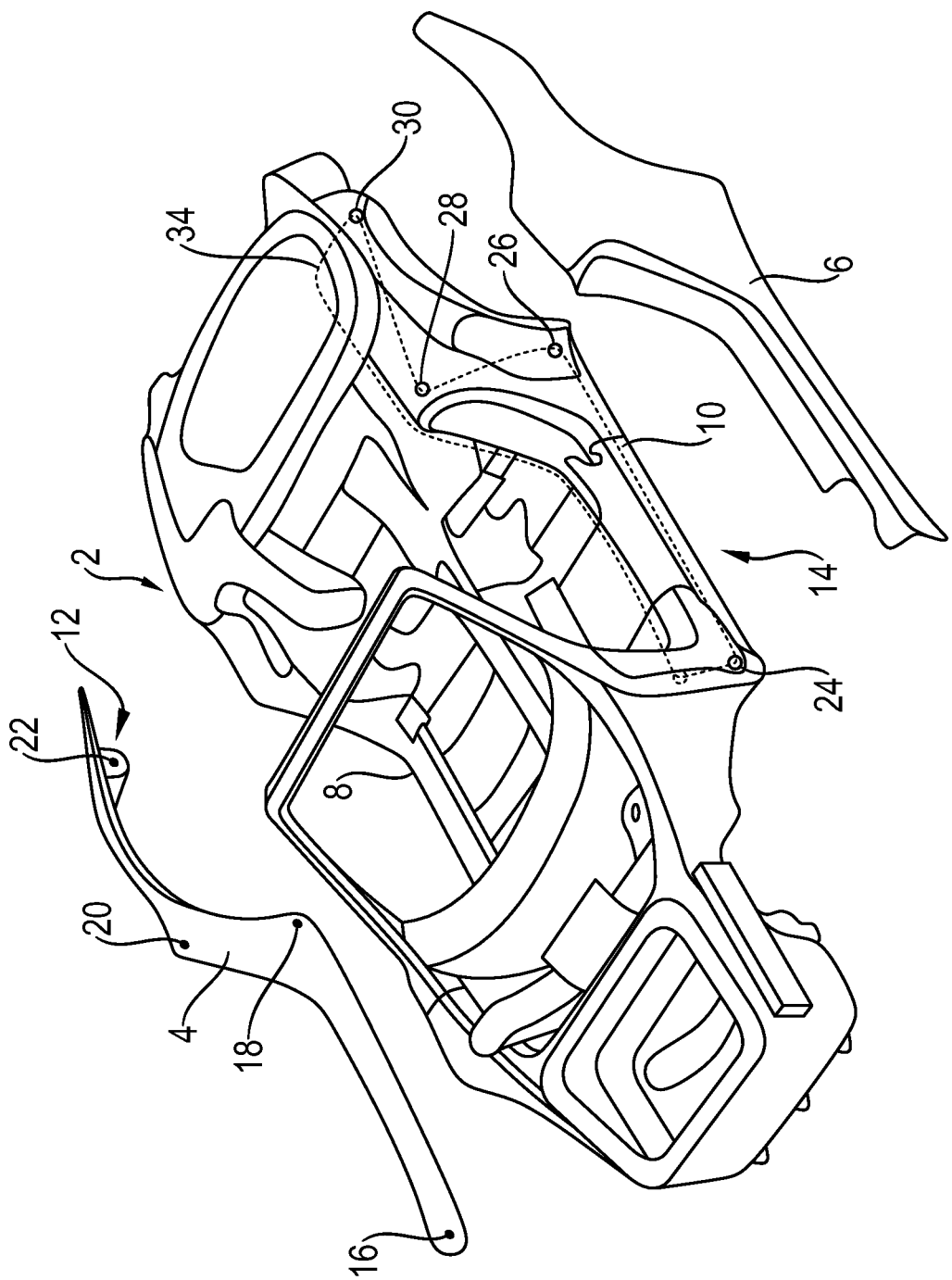
FIG. 1 is an exploded perspective view of a body shell.

FIG. 1 shows an exploded perspective view of a body shell 2 having two vehicle attachment elements 4, 6 each formed as a rocker-fender body part in the present embodiment. The vehicle attachment elements 4, 6 are provided for fastening to the respective carrier elements 8, 10 of the body shell 2. Here, a body part holder arrangement 12, 14 is provided for each vehicle attachment element 4, 6, which is each constructed from four pin elements 16, 18, 20 and 22 and four chamber elements 24, 26, 28 and 30. The respective pin elements 16, 18, 20, 22 and the associated chamber elements 24, 26, 28, 30, which are each shown for only one side of the body shell 2, form a zero point clamping system 32 (see FIG. 2), which can be actuated by a clamping medium. In the present exemplary embodiment, the clamping medium is current so that the respective clamping system 32 can be electrically actuated. The pin elements 16, 18, 20 and 22 can be integrally connected to the respective vehicle attachment element 4, 6. However, as in the present exemplary embodiment, they can also be arranged subsequently on the respective rocker-fender body part 4, 6, which is configured as a metal part. The chamber elements 24, 26, 28 and 30 and thus the clamping system 32 in the present exemplary embodiment are provided in an electrical conduit system 34 as a clamping medium circuit, which is schematically represented by a dashed line. This makes it possible to de-energize the clamping systems 32 by connecting only one power source, not shown further, and in this way to easily mount or dismount the vehicle attachment elements 4, 6. In the mounted state, the electrical conduit system 34 may then be used for vehicle data transmission. For this purpose, the chamber element 24 comprises an interface 42 and the pin element 16 comprises a connecting element 44. For example, an assistance system can thus be easily connected and used.

Figure 2:
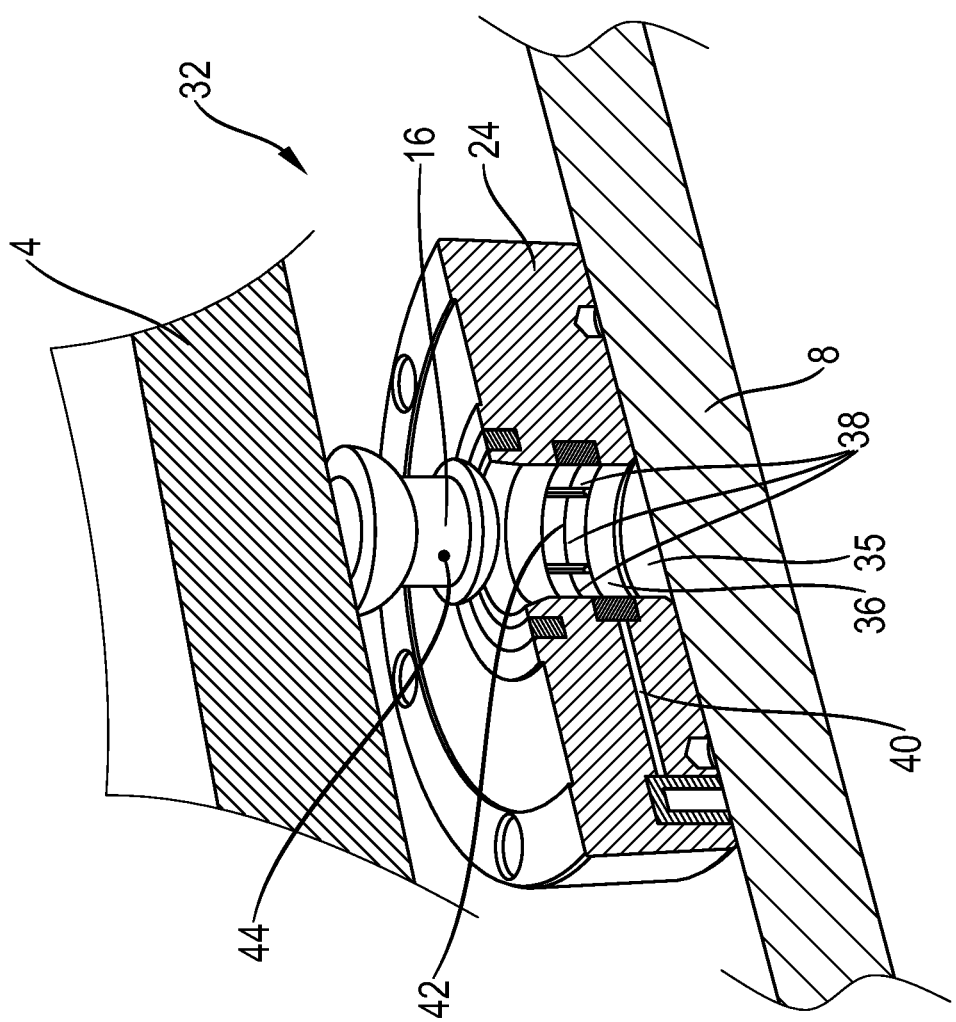
FIG. 2 is a perspective cross-sectional view of a clamping system.

FIG. 2 now shows a clamping system 32 in a perspective sectional view. In this case, the pin element of the vehicle attachment element 4 is designated with the reference numeral 16. The associated chamber element of the carrier element 8 is designated 24. The pin element 16 can be inserted into an opening 35 of the powered chamber element 24 when the vehicle attachment element 4 is mounted, in order to then be mechanically locked in the unpowered state by extension of the jaws 36 that are biased by spring elements 38. Reference numeral 40 denotes a power line that here connects the clamping system 32 to the electrical conduit system 34.

A method for mounting the vehicle attachment elements 4, 6 by means of the body part holder arrangement 12, 14 now takes place as follows: In a first step, the chamber elements 24, 26, 28, 30 arranged on the carrier element 8, 10 are powered and thereby actuated by a power source via the electrical conduit system 34. In a second step, the pin elements 16, 18, 20, 22 are guided into the respective chamber elements 24, 26, 28, 30 and thus the respective vehicle attachment elements 4, 6 are precisely arranged. In a third step, the chamber element is then de-energized and the zero point clamping systems 32 are mechanically locked. In a fourth step, the interface 42 of the clamping medium circuit 34 is then activated and in this way a sensor element not further shown is connected to the electrical conduit system 34 for data transmission. In order to replace the vehicle attachment elements 4, 6 at a later date, the at least one interface 42 must be deactivated in a fifth step and the chamber elements (24, 26, 28, 30) must be actuated by the clamping medium in a sixth step.

What is claimed is:

1. A clamping system for fastening a vehicle attachment element to a carrier element of a vehicle, said clamping system comprising:
    a chamber element disposed on one of the vehicle attachment element and the carrier element; and
    a pin element disposed on the other of the vehicle attachment element and the carrier element,
    wherein the clamping system is configured as a zero-point clamping system,
    wherein the chamber element is configured to be electrically actuated by an electrical power source via an electrical circuit that is connected to the chamber element,
    wherein, in an activated state of the power source, the chamber element is configured to either release or receive the pin element therein, and, in the deactivated state of the power source, the chamber element is configured to lock the pin element thereto,
    wherein the zero-point clamping system comprises an interface that is disposed on the chamber element and forms part of the electrical circuit,
    wherein the interface is configured to be connected to the pin element on the vehicle attachment element via the electrical circuit, such that the zero-point clamping system can also be used for transmission of vehicle data via the electrical circuit.

2. The clamping system according to claim 1, wherein the pin element is arranged on the vehicle attachment element and the chamber element is arranged on the carrier element.

3. The clamping system according to claim 2, wherein the pin element is integrally connected to the vehicle attachment element.

4. The clamping system according to claim 1, further comprising a plurality of the chamber elements, and wherein the plurality of the chamber elements each form part of the electrical circuit such that the plurality of the chamber elements can be electrically actuated together.

5. The clamping system according to claim 4, further comprising a power line connected to the interface of each of the plurality of the chamber elements.

6. The clamping system according to claim 5, wherein the power line forms part of the electrical circuit.

7. The clamping system according to claim 4, further comprising a plurality of the pin elements, each pin element being configured to mate with a respective one of the plurality of the chamber elements.

8. The clamping system according to claim 1, wherein the vehicle attachment element is a vehicle body panel, and the carrier element forms part of a basic body shell of a motor vehicle to which the vehicle body panel is configured to be connected.

9. The clamping system according to claim 1, wherein the chamber element comprises an opening for receiving the pin element and the interface is disposed on an interior surface of the opening facing the pin element.

10. The clamping system according to claim 1, wherein the chamber element is fixed on said one of the vehicle attachment element and the carrier element, and the pin element is fixed on said other of the vehicle attachment element and the carrier element.

* * * * *